United States Patent
Westergreen

(10) Patent No.: US 11,740,782 B2
(45) Date of Patent: Aug. 29, 2023

(54) OUT-OF-BAND COMMISSIONING OF A WIRELESS DEVICE THROUGH PROXIMITY INPUT

(71) Applicant: Disruptive Technologies Research AS, Rådal (NO)

(72) Inventor: Mads Westergreen, Viby-J (DK)

(73) Assignee: Disruptive Technologies Research AS

( * ) Notice: Subject to any disclaimer, the term of this patent is extended or adjusted under 35 U.S.C. 154(b) by 373 days.

(21) Appl. No.: 15/400,320

(22) Filed: Jan. 6, 2017

(65) Prior Publication Data

US 2017/0192669 A1 Jul. 6, 2017

Related U.S. Application Data

(60) Provisional application No. 62/275,353, filed on Jan. 6, 2016.

(51) Int. Cl.
| | |
|---|---|
| *G06F 3/04883* | (2022.01) |
| *G06F 3/01* | (2006.01) |
| *G06F 3/0346* | (2013.01) |
| *H04W 12/06* | (2021.01) |
| *H04W 4/38* | (2018.01) |
| *G06F 3/0484* | (2022.01) |
| *H04W 4/80* | (2018.01) |
| *H04W 12/50* | (2021.01) |
| *H04W 4/21* | (2018.01) |

(52) U.S. Cl.
CPC .......... *G06F 3/04883* (2013.01); *G06F 3/017* (2013.01); *G06F 3/0346* (2013.01); *G06F 3/0484* (2013.01); *H04W 4/38* (2018.02); *H04W 4/80* (2018.02); *H04W 12/06* (2013.01); *H04W 12/50* (2021.01); *H04W 4/21* (2018.02)

(58) Field of Classification Search
CPC .... G06F 3/04883; G06F 3/017; G06F 3/0346; G06F 3/0484; H04W 4/38; H04W 12/04; H04W 12/06; H04W 4/80; H04W 4/21; H04W 12/50
See application file for complete search history.

(56) References Cited

U.S. PATENT DOCUMENTS

| | | | |
|---|---|---|---|
| 2013/0065517 A1 | 3/2013 | Svensson et al. | |
| 2013/0065526 A1* | 3/2013 | Pottier | H04W 4/80 455/41.2 |
| 2013/0247117 A1* | 9/2013 | Yamada | H04W 4/029 340/12.5 |
| 2014/0123214 A1* | 5/2014 | Black | H04L 63/083 726/1 |

(Continued)

OTHER PUBLICATIONS

Written Opinion of the International Search Authority for International Patent Application No. PCT/IB2017/000329, 6 pages.

(Continued)

*Primary Examiner* — Cheng-Feng Huang
(74) *Attorney, Agent, or Firm* — Onyx IP Group

(57) ABSTRACT

A method of performing out-of-band commissioning is provided. The method may include enabling a pairing mode on a commissioning device, generating a gesture code on the commissioning device, receiving a gesture input on a node device, verifying an agreement between the gesture code and the gesture input, and commissioning the node device based on the agreement.

20 Claims, 3 Drawing Sheets

(56) References Cited

U.S. PATENT DOCUMENTS

| | | | |
|---|---|---|---|
| 2014/0139637 A1* | 5/2014 | Mistry | H04N 5/2252 348/46 |
| 2014/0176436 A1* | 6/2014 | Raffa | G06F 3/017 345/158 |
| 2014/0181926 A1 | 6/2014 | Larmo et al. | |
| 2014/0235166 A1* | 8/2014 | Molettiere | H04B 7/26 455/41.2 |
| 2015/0058942 A1* | 2/2015 | Dermu | H04W 12/35 726/6 |
| 2015/0189461 A1* | 7/2015 | Pang | H04W 76/14 455/41.1 |
| 2015/0244853 A1* | 8/2015 | Shin | H04W 76/10 455/420 |
| 2015/0331501 A1* | 11/2015 | Nicholson | G06F 3/0383 345/173 |
| 2015/0332031 A1* | 11/2015 | Mistry | H04W 12/06 726/19 |
| 2015/0346701 A1* | 12/2015 | Gordon | G05B 15/02 700/275 |
| 2016/0062572 A1* | 3/2016 | Yang | H04W 76/14 715/835 |
| 2016/0105924 A1* | 4/2016 | Baek | H04W 76/10 455/41.2 |
| 2016/0227600 A1* | 8/2016 | Shedletsky | H04M 1/72463 |

OTHER PUBLICATIONS

Communication from the European Patent Office for European Patent Application No. 17720564.8, 7 pages.

* cited by examiner

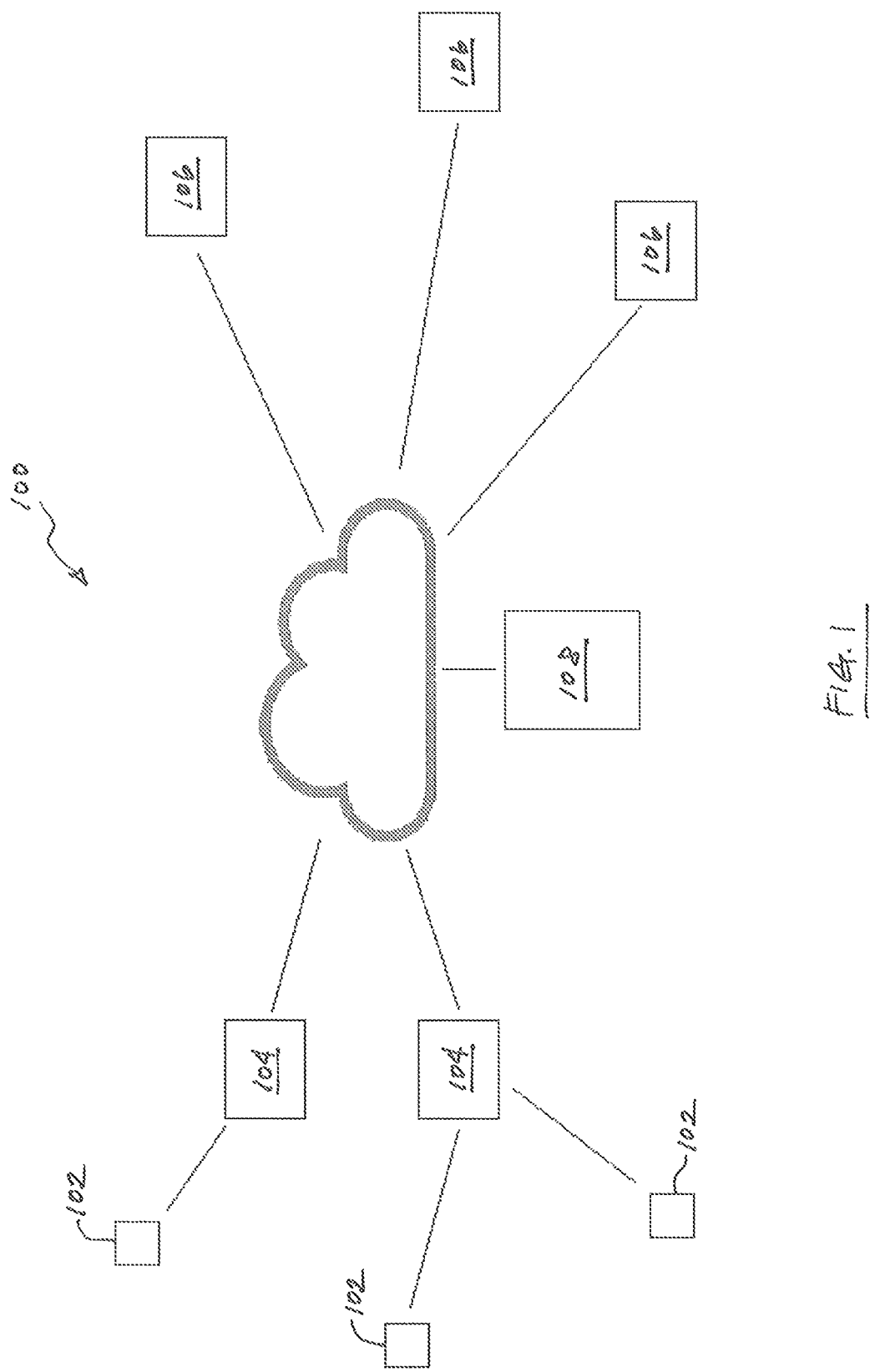

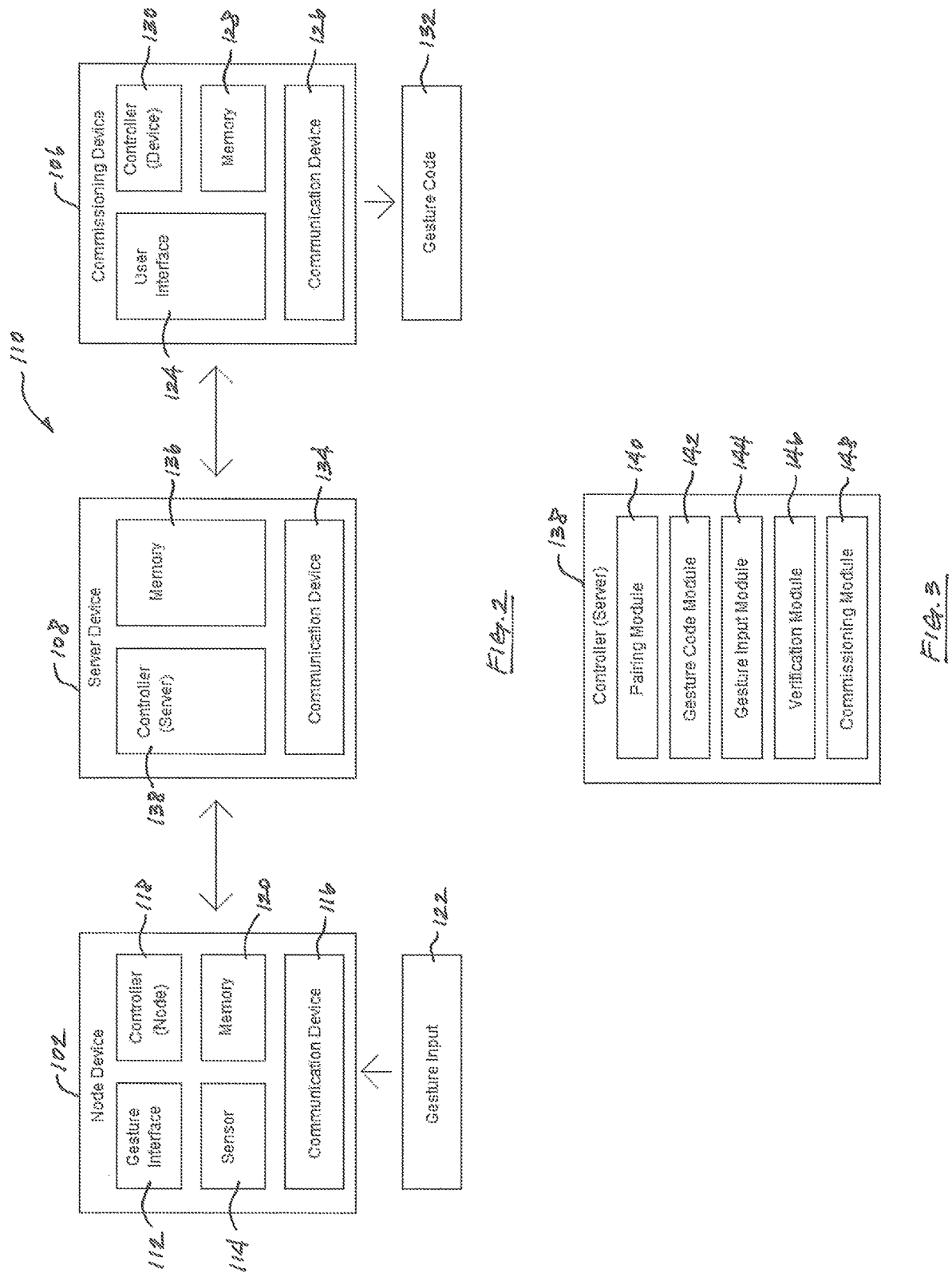

OUT-OF-BAND COMMISSIONING OF A WIRELESS DEVICE THROUGH PROXIMITY INPUT

TECHNICAL FIELD

The present disclosure relates generally to commissioning a node device to a network, and more particularly, to systems and methods for performing out-of-band commissioning of a wireless sensor node device.

BACKGROUND

In a general sense, commissioning refers to the process by which connectivity is established between a network-enabled device, or a node device, and the network. Furthermore, as used here, connectivity refers to not only being able to communicate with the node device, but also being able to identify and sufficiently differentiate between each connected node device. There are two general forms of commissioning, including in-band commissioning and out-of-band commissioning. In general, in-band commissioning refers to establishing a secure connection through the communication method used by the device itself, or in-band. Correspondingly, out-of-band commissioning refers to establishing network and security keys through means other than the main communication method used by the device.

The use of out-of-band commissioning may pose some particular challenges when the goal is to provide small, wireless node devices. Typically, conventional out-of-band commissioning schemes employ combinations of naming protocols, security keys, security protocols, and other network information to distinguish between and physically track different wireless node devices within a given network. However, in order to assign, retrieve and/or share such information, the individual node devices require displays, keyboards, keypads, or other bulky input devices. These are significant setbacks, which are not only limiting in terms of the physical size of a wireless node device, but in the case of wireless sensor node devices, also limiting in terms of the strategic placement of sensors.

The present disclosure is directed at addressing one or more of the deficiencies and disadvantages set forth above. However, it should be appreciated that the solution of any particular problem is not a limitation on the scope of this disclosure or of the attached claims except to the extent expressly noted.

SUMMARY OF THE DISCLOSURE

In one aspect of the present disclosure, a method of performing out-of-band commissioning is provided. The method may include enabling a pairing mode on a commissioning device, generating a gesture code on the commissioning device, receiving a gesture input on a node device, verifying an agreement between the gesture code and the gesture input, and commissioning the node device based on the agreement.

In another aspect of the present disclosure, a system for performing out-of-band commissioning is provided. The system may include a node device, a commissioning device, and a server device in communication with each of the node device and the commissioning device. The server device may include a controller configured to enable a pairing mode, generate a gesture code to be displayed on the commissioning device, receive a gesture input from the node device, verify an agreement between the gesture code and the gesture input, and commission the node device based on the agreement.

In yet another aspect of the present disclosure, a controller for performing out-of-band commissioning is provided. The controller may include a pairing module, a gesture code module, a gesture input module, a verification module, and a commissioning module. The pairing module may be configured to enable a pairing mode between a node device and a commissioning device. The gesture code module may be configured to generate a gesture code on the commissioning device. The gesture input module may be configured to receive a gesture input from the node device. The verification module may be configured to verify an agreement between the gesture code and the gesture input. The commissioning module may be configured to commission the node device based on the agreement.

These and other aspects and features will be more readily understood when reading the following detailed description in conjunction with the accompanying drawings.

BRIEF DESCRIPTION OF THE DRAWINGS

FIG. 1 is a diagrammatic view of one exemplary embodiment of a network formed by a system of the present disclosure;

FIG. 2 is a diagrammatic view of one exemplary out-of-band commissioning system of the present disclosure;

FIG. 3 is a diagrammatic view of one exemplary controller of the present disclosure.

Figure 4:
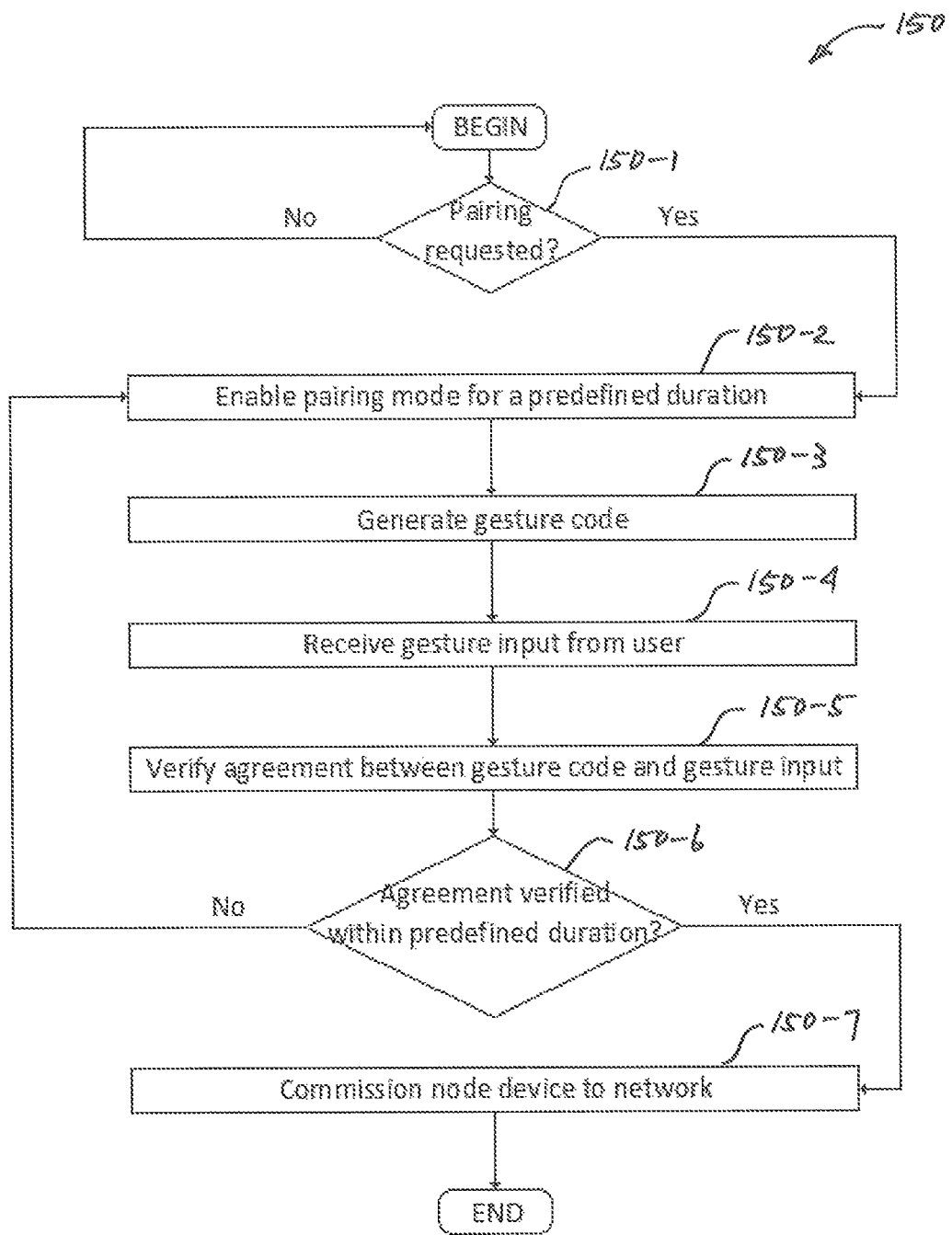
FIG. 4 is a flow diagram of one exemplary scheme or method of performing out-of-band commissioning.

While the following detailed description is given with respect to certain illustrative embodiments, it is to be understood that such embodiments are not to be construed as limiting, but rather the present disclosure is entitled to a scope of protection consistent with all embodiments, modifications, alternative constructions, and equivalents thereto.

DETAILED DESCRIPTION

Referring to FIG. 1, one exemplary embodiment of a network 100, such as a cloud network, is diagrammatically illustrated. In its simplest form, the network 100 may include one or more node devices 102, one or more gateway devices 104, one or more commissioning devices 106, and one or more server devices 108 that are in electronic communication with one another through the network 100. Moreover, the network 100 may be composed of any number of different network types, such as local area networks, wide area networks, or other networks that are local to a particular user, which are further in communication with a third-party service provider, such as a cloud service provider, through a connection to the Internet. In the example shown, the node devices 102, the gateway devices 104 and the commissioning devices 106 may be provided by a user, while the server devices 108 may be associated with a third-party service provider. While only one possible configuration of the network 100 is discussed herein, it will be understood that other variations or arrangements will be apparent to those skilled in the art.

In the particular arrangement shown in FIG. 1, the node devices 102 may represent wireless sensor nodes, or sensors that have wireless network-connectivity with the Internet, such as through the gateway devices 104 or other comparable means. For example, the node devices 102 may be configured to sense, detect, measure and/or monitor various parameters, such as temperature, pressure, proximity, touch, brightness, or the like, as well as changes therein, and communicate sensed data through the network 100. Although the node devices 102 discussed herein are directed to wireless sensor nodes, it will be understood that the present disclosure is similarly applicable to other types of nodes. In addition, the commissioning devices 106 may represent mobile phones, mobile tablets, laptop or desktop computers, electronic apparel, or any other network-enabled computing device that enables a user to interact with or otherwise access data provided by the node devices 102. Although not shown, the commissioning devices 106 may also employ intermediaries, such as gateways, cellular communication towers, or the like, to connect to the Internet.

Still referring to FIG. 1, the server devices 108 may represent computing devices, such as servers and associated databases, which may be provided by or otherwise associated with a third-party service provider, such as a cloud service provider. Among other things, the server devices 108 may provide a service which enables a user on a commissioning device 106 to commission, or electronically identify and recognize each of the individual node devices 102 connected to the network 100, as well as securely communicate with the commissioned node devices 102. The service provided by the server devices 108 may be provided in the form of web-based interfaces, application-based interfaces, or combinations thereof, which may be downloaded, installed or otherwise accessible through the commissioning devices 108. More particularly, for the purposes of the present disclosure, the server devices 108 may enable a simplified scheme for performing out-of-band commissioning of wireless sensor node devices 102.

Turning now to FIG. 2, one exemplary system 110 for performing out-of-band commissioning is diagrammatically provided. As shown, the system 110 may generally include at least one node device 102, at least one commissioning device 106, and at least one server device 108 in communication with each of the node device 102 and the commissioning device 106, such as via the Internet and the network 100. Among other things, the node device 102 may include at least a gesture interface 112, a sensor 114 and a communication device 116. The node device 102 may also include a node controller 118 that is in communication with each of the gesture interface 112, the sensor 114 and the communication device 116, and configured to control the operation of the node device 102 based on preprogrammed instructions installed thereon. The node controller 118 may further access a memory 120 that is configured to retrievably store such preprogrammed instructions, and at least temporarily store any other relevant information detected by the sensor 114.

As shown in FIG. 2, the gesture interface 112 may include a simplified interface that is capable of receiving a gesture input 122 from a user. Specifically, the gesture interface 112 may be sensitive to touch, proximity, light, and/or any other form of input that can be used to sense, detect and distinguish between different gestures physically and actually provided by a user. While other forms are possible, the gesture input 122 in FIG. 2 for example may be received in the form of a sequence of hand gestures, such any one or more of a tap, a touch, a hold, a swipe, a wave, proximity of a physical object, and the like. In addition, the sensor 114 may be at least partially incorporated within or separately provided from the gesture interface 112, and configured to sense, detect, measure and/or monitor various parameters, such as temperature, pressure, proximity, touch, brightness, or the like, as well as changes therein. Furthermore, the gesture input 122, or sequence of actual gestures received by the gesture interface 122, as well as any sensor data detected by the sensor 114 may be at least temporarily stored in the memory 120 and ultimately communicated to the server device 108 and/or the commissioning device 106 via the communication device 116.

Still referring to FIG. 2, the commissioning device 106 may generally include at least a user interface 124, a communication device 126, a memory 128 and a device controller 130 in communication with each of the user interface 124, the communication device 126 and the memory 128. Among various other operations, the device controller 130 may be configured to at least enable a user to perform out-of-band commissioning, and thereby, pair or connect to one or more wireless sensor node devices 102 over the network 100. More specifically, the device controller 130 may be programmed with instructions configured to interact with a user, such as present a gesture code 132 via the user interface 124, and communicate commissioning information to and from the server device 108. The device controller 130 may be programmed via a program, an application, a web-based service, an add-on, a plug-in, or the like, that is installed or at least temporarily stored in the memory 128, or otherwise accessible to the device controller 130.

As shown in FIG. 2, the commissioning device 106 may operate in conjunction with the server device 108 to commission one or more node devices 102. Specifically, the server device 108 may generally include at least a communication device 134, a memory 136 and a server controller 138 in communication with each of the communication device 134 and the memory 136. Among other roles, the server controller 138 may be configured to enable out-of-band commissioning between one or more available node devices 102 and one or more commissioning devices 106 that are connected over the network 100 via the communication device 134. The server controller 138 may also be configured to, for example, provide user access to a cloud service, manage operations associated with the service provided, maintain secure network connections, and the like. The server controller 138 may be preprogrammed with algorithms, codes and/or instructions that are installed or at least temporarily stored in the memory 136. The memory 136 may include storage media that is local to the server controller 138, within a local network of the server controller 138, in a database that is accessible to the server controller 138, or the like.

Referring now to FIG. 3, one exemplary embodiment of the server controller 138 is diagrammatically illustrated. In particular, the server controller 138 may be configured to function according to one or more preprogrammed algorithms or logic instructions, which may be generally categorized into, for example, a pairing module 140, a gesture code module 142, a gesture input module 144, a verification module 146, and a commissioning module 148. As mentioned above, the algorithms or logic instructions used to operate the server controller 138 may be retrieved from the memory 136, which may include storage that is on-board, local and/or remotely situated relative to the server controller 138. Furthermore, it will be understood that the arrangement of grouped code or logic instructions shown in FIG. 3 merely demonstrates one possible way to implement and perform the functions of the commissioning system 110, and that other comparable arrangements are possible and will be apparent to those of ordinary skill in the art. For instance, other embodiments may modify, merge, omit and/or add to any of the algorithms or logic instructions represented in FIG. 3 and still provide comparable results.

With reference to FIG. 2, the pairing module 140 of FIG. 3 may be configured to enable a pairing mode between a node device 102 and a commissioning device 106. The pairing mode may be initiated in response to a request from the user, which may be received via the user interface 124 of a commissioning device 106 and communicated to the server device 108 over the network 100. When pairing mode is enabled, the gesture code module 142 may be configured to generate a gesture code 132 to be displayed or otherwise communicated to the user via the user interface 124 of the commissioning device 106. In particular, the gesture code 132 may be generated based on a randomized sequence of predefined gestures, for example, gestures corresponding to tapping, touching, holding, swiping, waving, and any other gesture that the node device 102 is capable of receiving. Furthermore, the gesture code 132 may be sufficiently unique to distinguish the particular node device 102 to be paired or commissioned from other node devices 102 on the network 100, or even sufficiently unique to serve as a unique security key.

Once a gesture code 132 has been generated by the gesture code module 142 of FIG. 3, the user may be prompted via the user interface 124 of the commissioning device 106 to perform the gestures indicated by the gesture code 132 via the gesture interface 112 of the node device 102 in order to pair and commission the node device 102 to the network 100. Meanwhile, the gesture input module 144 of FIG. 3 may communicate with the node device 102, and enable the gesture interface 112 to receive a corresponding gesture input 122 from the user. Ideally, the user will perform the sequence of gestures on the node device 102 as prompted via the gesture code 132 to complete the pairing. The gesture input 122 received by the node device 102 may then be communicated to the server device 108 to be verified. Additionally or optionally, a pairing window, or a predefined duration of time, may be associated with the gesture code 132, where the node device 102 will stop receiving gestures and where the pairing mode will automatically terminate and/or restart if a matching gesture input 122 is not received within the pairing window.

In turn, the verification module 146 of FIG. 3 may be configured to verify an agreement between the gesture code 132 and the gesture input 122 received at the node device 102. For example, the verification module 146 may compare the individual gestures as well as the sequence of gestures received via the gesture input 122, to those of the gesture code 132. If the sequence of gestures within the gesture code 132 is substantially present within the gesture input 122, the verification module 146 may verify that an agreement exists. If, however, there is substantial mismatch between the gesture code 132 and the gesture input 122, the verification module 146 may conclude that an agreement does not exist. The verification module 146 may also apply varying degrees of accuracy in verifying agreements between the gesture code 132 and the gesture input 122. For instance, in more lenient applications, an agreement may be verified even if one or more gestures are not identical or in the correct sequence. Alternatively, in more critical applications, agreements may not be verified unless the sequence of gestures received is identical to that of the gesture code 132.

Furthermore, the commissioning module 148 of FIG. 3 may be configured to confirm or deny a pairing or commission of a node device 102 based on whether an agreement was found or verified by the verification module 146. Specifically, if the verification module 146 determined that an agreement existed between the gesture code 132 and the gesture input 122, the commissioning module 148 may add the node device 102 to the network 100, and record addressing or identifying information that is specific to the node device 102 for future use. Additionally or optionally, the commissioning module 148 may employ the gesture code 132, or some derivative thereof, as the unique security key or the identifying information specific to the node device 102. If no agreement was verified, the commissioning module 148 may terminate the pairing mode and deny the commissioning of that node device 102. As indicated above, the verification module 146 and/or the commissioning module 148 may further deny the pairing or commissioning if an agreement between the gesture code 132 and the gesture input 122 is not found within a pairing window or a predefined duration of time.

Turning now to FIG. 4, one exemplary algorithm or method 150 of performing out-of-band commissioning and/or for operating the system 110 of FIG. 2 is provided. In particular, the method 150 may be implemented in the form of one or more algorithms, instructions, logic operations, or the like, and the individual processes thereof may be performed or initiated via any combination of the node controller 118, the device controller 130 and the server controller 138 of FIG. 2. As shown in block 150-1, the method 150 may initially determine whether pairing has been requested by a user, such as via the commissioning device 106. If pairing has not been requested, the method 150 may continue monitoring for such a request. If, however, pairing has been requested, the method 150 in block 150-2 may enable a pairing mode, as discussed with respect to the pairing module 140 of FIG. 3. Additionally or optionally, the method 150 in block 150-2 may establish a pairing window, or essentially enable the pairing mode only for a predefined duration of time.

According to block 150-3 of FIG. 4, the method 150 may further generate a gesture code 132 to be communicated to a user, as discussed in relation to the gesture code module 142 of FIG. 3. In block 150-4, the method 150 may away for and receive a corresponding gesture input 122 from the node device 102, as discussed with respect to the gesture input module 144 of FIG. 3. Once a gesture input 122 has been received, or as soon as a gesture input 122 is being entered via the node device 102, the method 150 in block 150-5 may begin verifying whether a substantial agreement exists between gesture code 132 and the gesture input 122, as discussed in relation to the verification module 146 of FIG. 3. Furthermore, the method 150 in block 150-6 may determine whether an agreement has been verified, and whether the verification has occurred within the pairing window or predefined duration set in block 150-2. If no agreement is found within the predefined duration, the method 150 may return to block 150-2 to restart another pairing mode automatically or by user request.

If, however, an agreement has been verified and within the predefined duration, the method 150 may proceed to block 150-7 of FIG. 4 to pair or commission the node device to the network 100, as discussed with respect to the commission module 148 of FIG. 3. As discussed above, this may further involve recording identifying information specific to the node device 102 for future use, or employing the gesture code 132, or some derivative thereof, as the unique security key or the identifying information for the node device 102. Once the given node device 102 has been commissioned, the method 150 may return to block 150-1 to continue monitoring for additional pairing requests. Furthermore, the method 150 depicted in FIG. 4 may be reiterated periodically or upon each pairing request. While only one arrangement of tasks, functions or operations are shown in FIG. 4, it will be understood that other arrangements or variations may be similarly employed. Other arrangements, for example, may modify, merge, omit and/or add to any of the blocks shown in FIG. 4 and still provide comparable results.

From the foregoing, it will be appreciated that while only certain embodiments have been set forth for the purposes of illustration, alternatives and modifications will be apparent from the above description to those skilled in the art. These and other alternatives are considered equivalents and within the spirit and scope of this disclosure and the appended claims.

What is claimed is:

1. A method of performing out-of-band commissioning by a server device, the method comprising:
    enabling, by the server device, a pairing mode on a commissioning device;
    generating, by the server device, a gesture code based on enabling the pairing mode,
        wherein the gesture code uniquely identifies a node device from a plurality of node devices;
    providing, by the server device, the gesture code to the commissioning device for display by the commissioning device,
        wherein providing the gesture code causes the commissioning device to provide a prompt for gestures, indicated by the gesture code, to be performed via a node device,
        wherein the gesture code is provided to perform out-of-band commissioning of the node device via the commissioning device, and
        wherein the out-of-band commissioning enables the node device to establish a secure connection with a network via the commissioning device;
    receiving, by the server device, a gesture input from the node device based on the prompt for gestures provided to the node device;
    comparing, by the server device, the gesture code and the gesture input to verify an agreement between the gesture code and the gesture input;
    commissioning, by the server device, the node device to enable the node device to establish a connection with the network, based on comparing the gesture code and the gesture input to verify the agreement; and
    simultaneously commissioning the plurality of node devices through at least one gateway device.

2. The method of claim 1, wherein the gesture code includes a randomized sequence of predefined gestures, wherein the randomized sequence of predefined gestures uniquely identifies the node device, wherein the gesture input includes a sequence of actual gestures received from a user through the node device, and wherein the agreement is verified when the sequence of actual gestures received from the user corresponds to the randomized sequence of predefined gestures.

3. The method of claim 2, wherein the randomized sequence of predefined gestures and the sequence of actual gestures include one or more of a tap, a touch, a hold, a swipe, a wave, or proximity of an object.

4. The method of claim 1, wherein the gesture code is maintained as a unique security key that uniquely identifies the node device.

5. The method of claim 1, wherein the gesture code is displayed through a user interface of the commissioning device, and wherein the gesture input is received by interactions with a gesture interface of the node device.

6. The method of claim 1, wherein the pairing mode is enabled for a predefined duration, and wherein commissioning the node device is denied if the agreement is not verified within the predefined duration.

7. The method of claim 6, wherein the pairing mode is automatically restarted if the agreement is not verified within the predefined duration.

8. A system for performing out-of-band commissioning, the system comprising:
    a node device;
    a commissioning device; and
    a server device in communication with each of the node device and the commissioning device, the server device having a controller configured to:
        enable a pairing mode on the commissioning device,
        generate a gesture code to be displayed on the commissioning device,
            wherein the gesture code uniquely identifies the node device out of a plurality of node devices,
        provide the gesture code to the commissioning device for display,
            wherein providing the gesture code causes the commissioning device to provide a prompt for gestures, indicated by the gesture code, to be performed via the node device, and
            wherein the gesture code is provided to perform out-of-band commissioning of the node device via the commissioning device,
        receive a gesture input from the node device based on providing the gesture code to the commissioning device for display,
        compare the gesture code and the gesture input to verify an agreement between the gesture code and the gesture input,
        perform out-of-band commissioning of the node device to establish a connection with a network and the node device via the commissioning device,
            wherein the out-of-band commissioning is performed based on comparing the gesture code and the gesture input to verify the agreement, and
        simultaneously commission the plurality of node devices through at least one gateway device.

9. The system of claim 8, wherein the node device is a wireless sensor node device.

10. The system of claim 8, wherein the controller is configured to:
    generate the gesture code based on a randomized sequence of predefined gestures,
    receive the gesture input as a sequence of actual gestures received from a user through the node device, and
    verify the agreement when the sequence of actual gestures received from the user corresponds to the randomized sequence of predefined gestures.

11. The system of claim 10, wherein the randomized sequence of predefined gestures and the sequence of actual gestures include one or more of a tap, a touch, a hold, a swipe, a wave, or proximity of an object.

12. The system of claim 8, wherein the controller is configured to:
    display the gesture code via a user interface of the commissioning device, and
    receive the gesture input via a gesture interface of the node device.

13. The system of claim 8, wherein the controller is configured to:
    enable the pairing mode for a predefined duration, and deny commissioning of the node device if the agreement is not verified within the predefined duration.

14. The system of claim 13, wherein the controller is configured to automatically restart the pairing mode if the agreement is not verified within the predefined duration.

15. The system of claim 8, wherein the controller is configured to:
store gesture codes used to commission the plurality of node devices as unique security keys.

16. A system for performing out-of-band commissioning, the system comprising:
a controller configured to:
enable a pairing mode on a commissioning device;
generate a gesture code;
provide the gesture code to the commissioning device for display,
wherein providing the gesture code causes the commissioning device to provide a prompt for gestures, indicated by the gesture code, to be performed via a node device, and
wherein the gesture code is provided to perform out-of-band commissioning of the node device via the commissioning device;
receive a gesture input from the node device based on providing the gesture code being displayed by the commissioning device;
compare the gesture code and the gesture input to verify an agreement between the gesture code and the gesture input;
commission the node device based on the agreement; and
simultaneously commission a plurality of node devices.

17. The system of claim 16, wherein the controller is further configured to:
generate the gesture code based on a randomized sequence of predefined gestures,
receive the gesture input as a sequence of actual gestures received from a user through the node device, and
verify the agreement when the sequence of actual gestures received from the user corresponds to the randomized sequence of predefined gestures.

18. The system of claim 17, wherein the randomized sequence of predefined gestures and the actual gestures include one or more of a tap, a touch, a hold, a swipe, a wave, or proximity of an object.

19. The system of claim 16, wherein the controller is further configured to:
enable the pairing mode for a predefined duration, and
deny commission of the node device if the agreement is not verified within the predefined duration.

20. The system of claim 16, wherein the controller is further configured to:
store gesture codes used to commission the plurality of node devices as unique security keys.

\* \* \* \* \*